United States Patent
Warrier et al.

(10) Patent No.: US 6,795,705 B1
(45) Date of Patent: Sep. 21, 2004

(54) HOT STANDBY PROTOCOL FOR WIRELESS DEVICES

(75) Inventors: Chandra Warrier, Schaumburg, IL (US); Yingchun Xu, Buffalo Grove, IL (US); Narothum Saxena, Buffalo Grove, IL (US)

(73) Assignee: UTStarcom, Inc., Alameda, CA (US)

( * ) Notice: Subject to any disclaimer, the term of this patent is extended or adjusted under 35 U.S.C. 154(b) by 549 days.

(21) Appl. No.: 09/703,099

(22) Filed: Oct. 31, 2000

(51) Int. Cl.$^7$ ................................................ H04Q 7/20
(52) U.S. Cl. ...................... 455/435.1; 455/433; 455/423
(58) Field of Search ............................. 455/435.1, 433, 455/436, 423, 424, 446; 370/328, 351, 466; 709/245, 224

(56) References Cited

U.S. PATENT DOCUMENTS

| | | | | |
|---|---|---|---|---|
| 5,953,662 | A | * | 9/1999 | Lindquist et al. ............ 455/433 |
| 6,195,705 | B1 | * | 2/2001 | Leung .......................... 709/245 |
| 6,560,217 | B1 | * | 5/2003 | Peirce et al. .................. 370/351 |
| 6,577,644 | B1 | * | 6/2003 | Chuah et al. ................. 370/466 |
| 2002/0046277 | A1 | * | 4/2002 | Barna et al. .................. 709/224 |

FOREIGN PATENT DOCUMENTS

| | | | | |
|---|---|---|---|---|
| EP | 1 058 421 A2 | 12/2000 | ............ | H04L/12/28 |
| WO | WO 97/41703 | 11/1997 | ............ | H04Q/7/34 |
| WO | WO 00/51309 | 8/2000 | ............ | H04L/29/06 |

OTHER PUBLICATIONS

Afenya, Michelle, *MIP Home Agent Availability Updating,,* Motorola Technical Developments, Motorola Inc., Schaumburg, Illinois, vol. 38, pp. 189–190 (Jun. 1999).

Jue, Jason P. et al., *Design and Analysis of a Replicated Service Architecture for Supporting IP–Host Mobility,* Mobile Computing and Communications Review, vol. 2, No. 3, pp. 16–23 (Jul. 1998).

Perkins, C., *IP Mobility Support,* Network Working Group, RFC 2002, pps. 1–51 (Oct. 1996).

International Search Report for PCT Application Ser. No. PCT/US01/50305, Dated Dec. 4, 2002.

* cited by examiner

Primary Examiner—Erika Gary
(74) Attorney, Agent, or Firm—McDonnell Boehnen Hulbert & Berghoff LLP

(57) ABSTRACT

A system for providing redundant home agents comprises a plurality of home agents, the home agents create mobility binding registrations with outside PDSNs. The system also includes a redundant home agent, the redundant home agent is coupled to said plurality of home agents. A home agent control node is coupled to the plurality of home agents and sends registration requests to the home agents. The home agent control node contains a detector for determining a failure in any of the plurality of home agents. The home agent control node also contains a mobility binding registration and downloads the mobility binding registration to the redundant home agent upon the detection of a failure in one of the plurality of home agents.

12 Claims, 5 Drawing Sheets

HOT STANDBY PROTOCOL FOR WIRELESS DEVICES

FIELD OF THE INVENTION

This present invention relates to networks having standby agents. More specifically, it relates to third generation networks and standby home agents.

BACKGROUND OF THE INVENTION

Various types of telecommunication networks have evolved over the past few years. For example, third generation networks have evolved that seek to integrate wireless networks to other networks, such as the Internet. Such integration allows users of wireless networks to access Internet services.

In one example of a third generation network, a mobile node (such as a cellular phone) communicates via an air interface to a radio access network (RAN). The RAN is coupled to an IP network via an interface. The RAN comprises base stations, switches, and control entities, which allow a mobile device to communicate with fixed, landline devices. The IP network can be coupled to various servers that provide access to other networks, such as the Internet.

The IP network includes, for example, switches and network management entities, which route IP packets through the IP network. The management entities include managers and agents. A manager may be an entity that can query agents, receive responses from the agents, and send instructions to these agents. An agent responds to the requests and performs management functions on various resources in the network. The agent interprets information contained in a management information base (MIB). The MIB contains information that relates to the managed resource.

The mobile node can move from a "home" network to "foreign" networks. The home network may need to forward packets of information to the mobile node in a foreign network. If information is to be forwarded to the mobile node, then the network needs to know the location of the mobile node.

The mobile node has a static address, called a home address, which is used to identify the mobile node so that packets of information can be routed to and from the mobile node. The home address makes it appear that the mobile node is able to receive data on the home network. A home agent exists on the home network, which helps to manage the activities of the mobile node and other mobile nodes having a home address on the home network. As the mobile node moves to foreign networks, the home agent forwards received packets destined for the mobile node and arranges to deliver these packets to the mobile node at its location in the foreign network.

Whenever the mobile node moves to a foreign network, it registers its new foreign agent address with its home agent. To transmit a packet from the home network to the new foreign agent address requires that the packet be modified. This reconstruction, or tunneling, bypasses the usual effects of IP routing.

Foreign agents help maintain communications over links utilizing a point-to-point protocol (PPP). In order to establish communications over a point-to-point link, each end of the link must first send packets that help configure the link. After the link has been established, the link can be authenticated before the transmission of packets. The point-to-point protocol provides a standard method of encapsulating Network Layer protocol information over point-to-point links. The point-to-point protocol encapsulates data over data link connections; establishes, configures, and tests the data link connection; and establishes and configures different network-layer protocols.

Home agents may utilize various databases in their operations. Home and foreign networks may also have collection of databases, which store various types of information. Managing dispersed serial line and modem pools for large numbers of users can create the need for significant administrative support. Since modem pools link a user to other users, authorization, security, and accounting functions are required. This can be accomplished by managing a single database of users rather than multiple databases. A single database allows for authentication as well as configuration functions detailing the type of service, for example, PPP service, provided to a user.

Home agents and foreign agents may advertise their availability to mobile nodes on each communication link for which they provide service. A mobile node can send an inquiry on the link to learn if any prospective agents are present. When the mobile node is away from its home network, it registers its "care-of address" with its home agent. Depending on its method of attachment, the mobile node will register either directly with its home agent, or through a foreign agent, which forwards the registration to the home agent.

Foreign agents and home agents advertise their presence to mobile nodes via agent advertisement messages. A mobile node may solicit an agent advertisement message from any foreign or home agent through an agent solicitation message. A mobile node receives these agent advertisements from the foreign or home agent and determines whether it is on its home network or a foreign network. When the mobile node detects that it is located on its home network, it operates without mobility services. If returning to its home network from being registered elsewhere, the mobile node de-registers with its home agent, through exchange of a registration request and registration reply message with it. When a mobile node detects that it has moved to a foreign network, it obtains a care-of address on the foreign network. The mobile node operating away from home then registers its new care-of address with its home agent through exchange of a registration request and registration reply message with it, possibly via a foreign agent. Information sent to the mobile node's home address are intercepted by its home agent, tunneled by the home agent to the mobile node's care-of address, received at the tunnel endpoint (either at a foreign agent or at the mobile node itself), and finally delivered to the mobile node.

In the reverse direction, information sent by the mobile node is generally delivered to its destination using standard IP routing mechanisms, not necessarily passing through the home agent. When away from home, tunneling is used to hide a mobile node's home address from intervening routers between its home network and its current location. The tunnel terminates at the mobile node's care-of address. The care-of address must be an address to which information can be delivered via conventional IP routing. At the care-of address, the original information is removed from the tunnel and delivered to the mobile node.

The Remote Authentication Dial In User Service (RADIUS) protocol for the Internet carries authentication, authorization, and configuration information between a Network Access Server, which desires to authenticate its links, and a Shared Authentication Server.

A network access server operates as a client of RADIUS. The client is responsible for passing user information to designated RADIUS servers, and then acting upon the request that is returned. RADIUS servers are responsible for receiving user connection requests, authenticating the user, and returning all configuration information necessary for the client to deliver to the user. A RADIUS server can act as a proxy client to other radius servers or other kinds of authentication servers.

Home agents can be dropped for a number of reasons. For example, hardware or software failure may result in the home agent malfunctioning and being dropped by the network. If a home agent fails, calls can be dropped. What is needed is a system and method whereby the failure of a home agent does not result in dropped calls. What is also needed is a system and method whereby the transfer from the failed home agent to the new home agent is transparent to the user. That is, the call flow should not be interrupted by the transfer.

SUMMARY OF THE INVENTION

The invention relates to a hot standby feature in a telecommunication network that does not impact a mobile node session.

In one embodiment of the present invention, a mobile node is coupled via an IP network having a home agent to various entities. These entities may include PDSNs, servers, and AAA nodes. Other examples of entities are possible. A home agent control node (HACN) and redundant home agents are also coupled to the IP network.

The mobile node registers its identity through the HACN. For example, each mobile node may have a registration mobility binding record (MBR) snapshot. The MBR snapshot for each mobile is recorded in a HACN, a standby for the HACN, and a home agent.

Periodically, the HACN polls its home agents to determine whether a particular home agent has failed. For example, the home agent may broadcast a heartbeat signal, which indicates that the home agent is functioning properly. The absence of a heartbeat signal indicates that the home agent has failed.

In the case of a home agent failure, the MBR snapshots associated with the failed home agent are transmitted from the HACN to a redundant home agent. The redundant home agent waits until all the proper MBR snapshots are downloaded from the HACN. When downloading is complete, the redundant home agent is activated and begins to broadcast the heartbeat signal.

In another aspect of the present invention, the HACN also has an associated HACN standby. Each registration is distributed over all HACNs. In case of the failure of one HACN, the standby HACN will replace the failed HACN.

The foregoing and other features and advantages of an illustrative embodiment of the present invention will be more readily apparent from the following detailed description, which proceeds with references to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1:
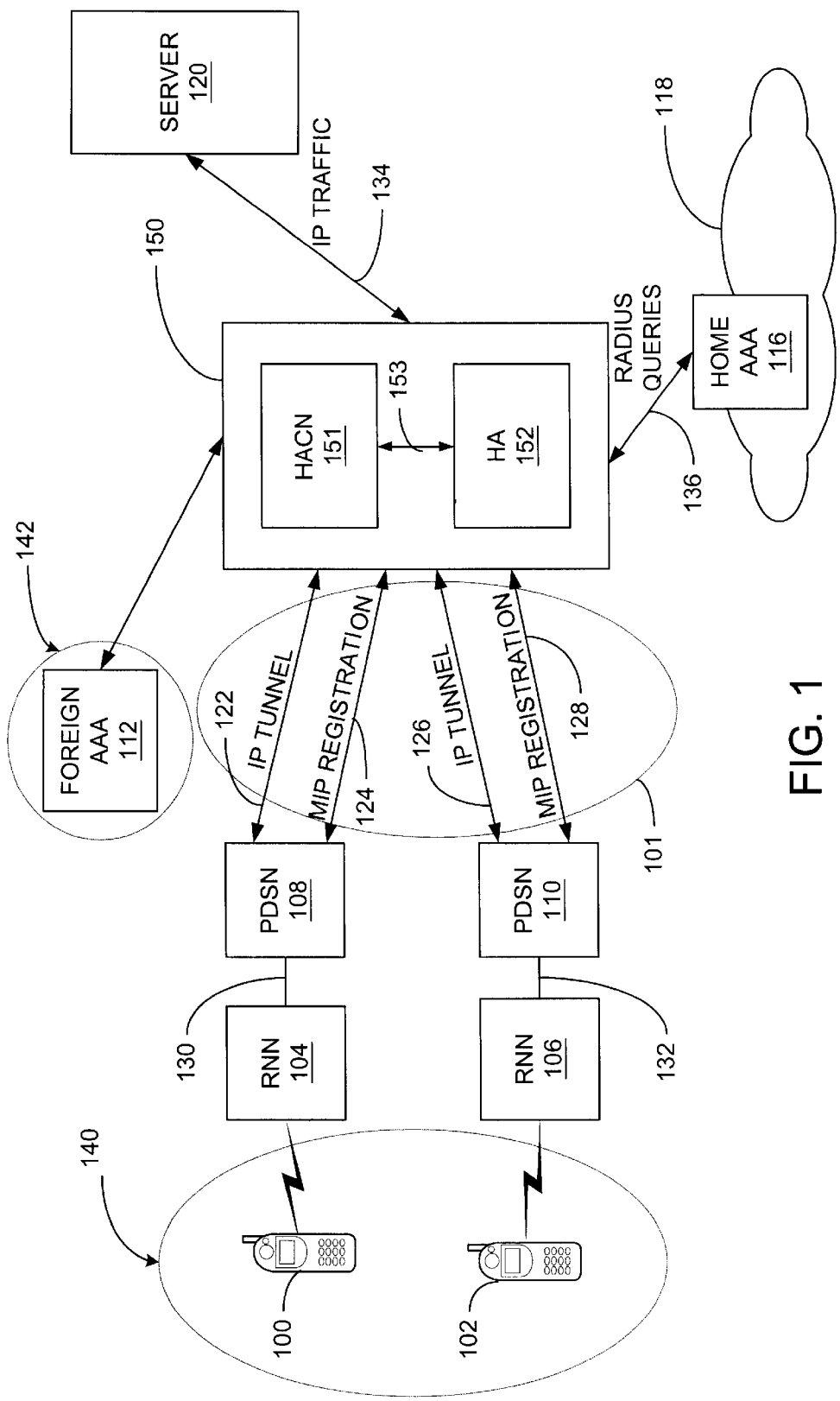
FIG. 1 is a block diagram illustrating an embodiment of a network according to principles of the present invention.

Referring now to FIG. 1, a network showing illustrative features of the present invention is described. The network comprises a mobile node (MN) 100. The mobile node 100 is coupled, via an air interface, to a radio network node (RNN) 104. The RNN 108 is coupled to a public data serving node (PDSN) 108. Similarly, a mobile node (MN) 102 is coupled to a radio network node 106 over an air interface. The RNN 106 is coupled to a public data serving node (PDSN) 110. PDSN 108 and PDSN 110 are coupled to home agent/home agent control node module 150. The mobile nodes 100 and 102 exist within a coverage area 140.

The mobile nodes 100 and 102 can be any type of mobile wireless device, for example, a cellular phone. They can also be used to transmit voice messages, data, and combinations of both voice and data. Other examples of mobile nodes and other functionalities are possible.

The RNNs 104 and 108 are radio network nodes. The RNNs 104 and 108 comprise the network equipment needed to interface a mobile node with a network 101. The RNNs 104 and 108 may comprise base stations, base station controllers, and databases. The databases include message binding registration databases, which contain information concerning the mobile mode. The RNNs may include other entities, as well.

The network 101 is an IP network that supports mobile IP. For example, the network could be a wireless local area network (LAN). Other examples of networks are possible.

The PDSNs 108 and 1 10 act as a network access server (NAS) device. They terminate PPP sessions from the MNs. The PDSNs 108 and 110 provide mobile IP foreign agent functionality for the MN and the HA/HACN module 150. The PDSN has functionality that causes it to work as a remote access server for mobile wireless nodes. The PDSN terminates the point-to-point (PPP) link from the mobile node. In addition, it performs mobile IP foreign agent functionality. For example, it may store the care-of-address for a mobile node. Other examples of foreign agent functionality are possible.

An IP tunnel 122 couples the PDSN 108 to the HACN/HA module 150 and transmits IP packets between the PDSN 108 and the HACN/HA module 150. An IP tunnel 126 couples the PDSN 110 to the HACN/HA module 150 and transmits IP packets between the PDSN 110 and the HACN/HA module 150. A MIP registration link 124 also couples the PDSN 108 to the HACN/HA module 150. A MIP registration link 128 also couples the PDSN 110 to the HACN/HA module 150. The MIP registration links 124 and 128 communicate MIP registration information between the PDSNs 108 and 110 and the HACN/HA 150.

MIP registration is a mechanism by which a foreign agent and home agent set up an IP tunnel. The foreign agent sends a request to set up the IP tunnel and the home agent replies to the request. If both agents agree that an IP tunnel is needed, then the two agents set up an IP tunnel. The IP tunnel between the foreign agent and the home agent carries packets between a mobile node and the server connected to the mobile node.

The HACN/HA module 150 comprises a HACN module 151 that is coupled to a home agent (HA) module 152. The coupling is accomplished using an internal bus 152. The HA module comprises a plurality of active home agents and at least one redundant HA. The HACN module comprises an active HACN and at least one redundant HACN.

The HACN polls all the home agents that it has been configured to provide service. One of the agents in the set of configured agents is selected to be a standby home agent. In the event of the home agent failing, the standby home agent is made operational and assumes the role of the home agent, which has failed.

Whenever an HA in the HA module fails, the active HACN will detect the failure. After the failure is detected, the switchover to the redundant HA is accomplished in a manner that no calls are affected or dropped. The switchover time can be configured to be in the order of a few seconds and this will cause minimal disruption for the calls. The switchover is transparent to the user. The HACN holds one or more MBR snapshots for each HA and these downloaded to the redundant HA during the switchover. Each MBR snapshot contains information of a mobile node.

The HACN/HA module is coupled to a server 120 and a home authentication, authorization, and accounting (AAA) module 116. The home AAA module 116 is part of an Internet Service Provider (ISP) network 118.

A foreign authentication, authorization, and accounting (AAA) module is part of a foreign network. The MNs 100 and 102 may transfer to an area covered by a coverage area 142. The foreign AAA 112 is also coupled, directly or indirectly, the HACN/HA module 150.

The home AAA and foreign AAA supply authentication, authorization, and accounting functions to their respective areas of service. For example, the home AAA and the foreign AAA authenticate whether a caller actually has subscribed to services provided by the network; authorize service once authentication has been established; and bill for services provided to various users. The home AAA is responsible for accepting proxied authentication requests from the foreign AAA and authenticating the requests. The home AAA also accepts RADIUS queries from the HA and responds to these queries. Other functions are possible.

The server 120 serves as a conduit between the HACN/HA module 150 and other networks. The server 120 could be a web host connected to the mobile node. It could be on the Internet if the mobile node is subscribing to Internet service. Alternatively, the server could be a mail server inside a corporation, if the mobile user is accessing a corporate local area network (LAN).

Figure 2:
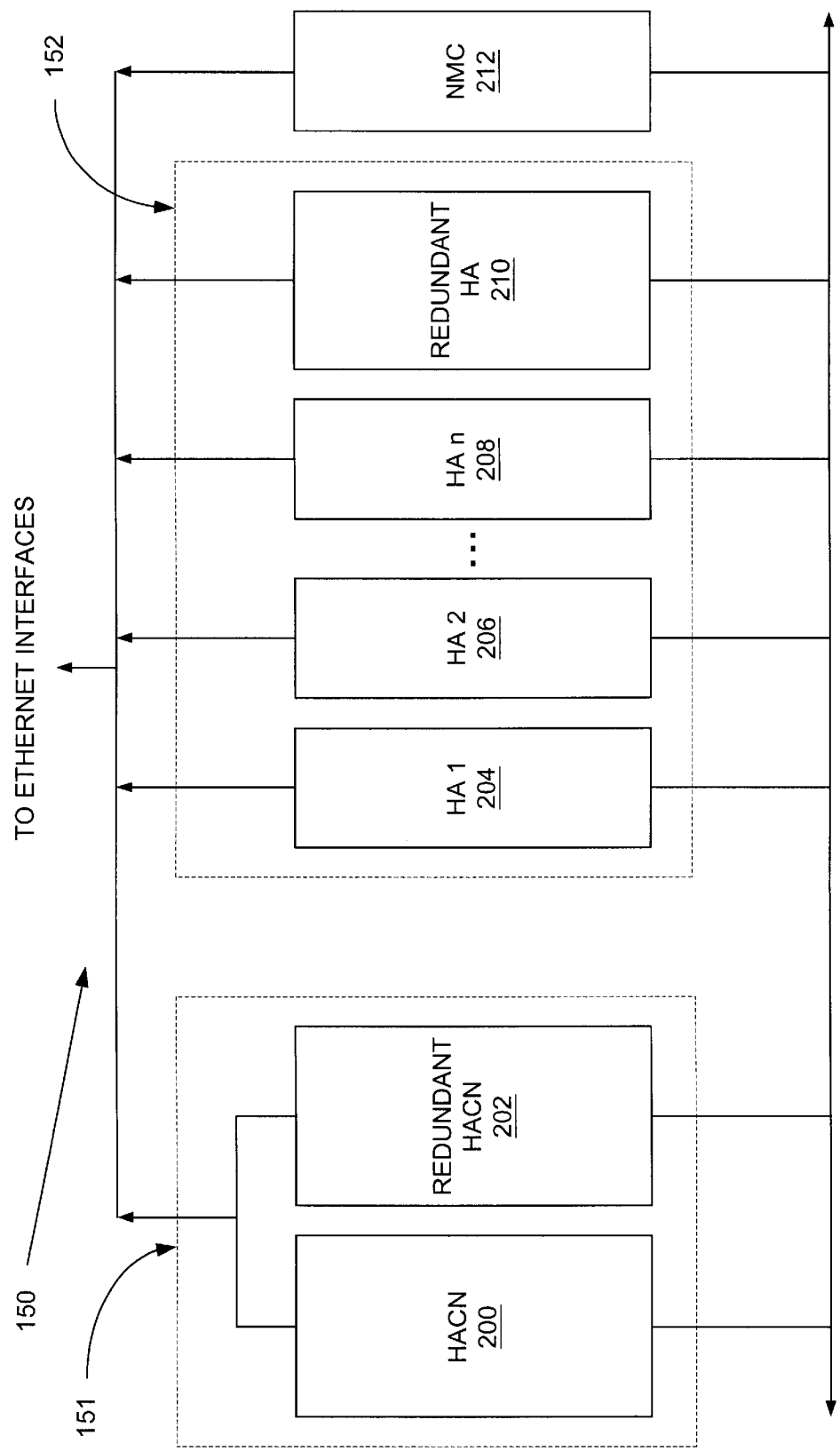
FIG. 2 is a block diagram of the home agent control node/home (HACN/HA) agent module according to principles of the present invention.

Referring now to FIG. 2, the IIHACN/HA module 150 is described. The HACN module 151 comprises a home agent control node (HACN) 200 and a redundant home agent control node (HACN) 204. The purpose of the HACN 200 is to accept all mobile IP registration messages from the MNs 100 and 102 via the PDSNs 108 and 110. The purpose of the redundant HACN is to provide a back-up for the HACN 200 in case the HACN 200 fails.

The module 151 may include both HAs and HACNs. However, the two may be part of separate modules, as well.

The HA section 152 comprises a plurality of home agents: a first HA 200, a second HA 202, and an nth HA 208. The HA section 152 also includes a redundant HA 210. The home agents in the HA section 152 are responsible for accepting registration requests from the HACNs in the HACN section and creating an MBR snapshot. In addition, the home agents create an IP tunnel to terminate tunneled traffic from the PDSNs. The home agents also decapsulate and route the traffic in the reverse direction to the networks of the Internet Service Providers. The home agents additionally receive IP traffic from the ISPs, encapsulate and tunnel the traffic in the forward direction to the PDSNs. Additional functions are possible.

Although only one redundant home agent is shown, it will be understood that multiple redundant home agents may also be used. For example, there may be a pair of redundant home agents to facilitate greater redundancy in the system.

A network management controller (NMC) 212 is coupled to the home agents and the home agent control nodes via the internal bus 153. The purpose of the network management controller 212 is to act as a management access point. The network management controller retrieves statistics about the performance of the HA and HACN. The network management controller 212 also can be used to configure the HA and HACN. Other functions of the network management controller 212 are possible.

Figure 3:
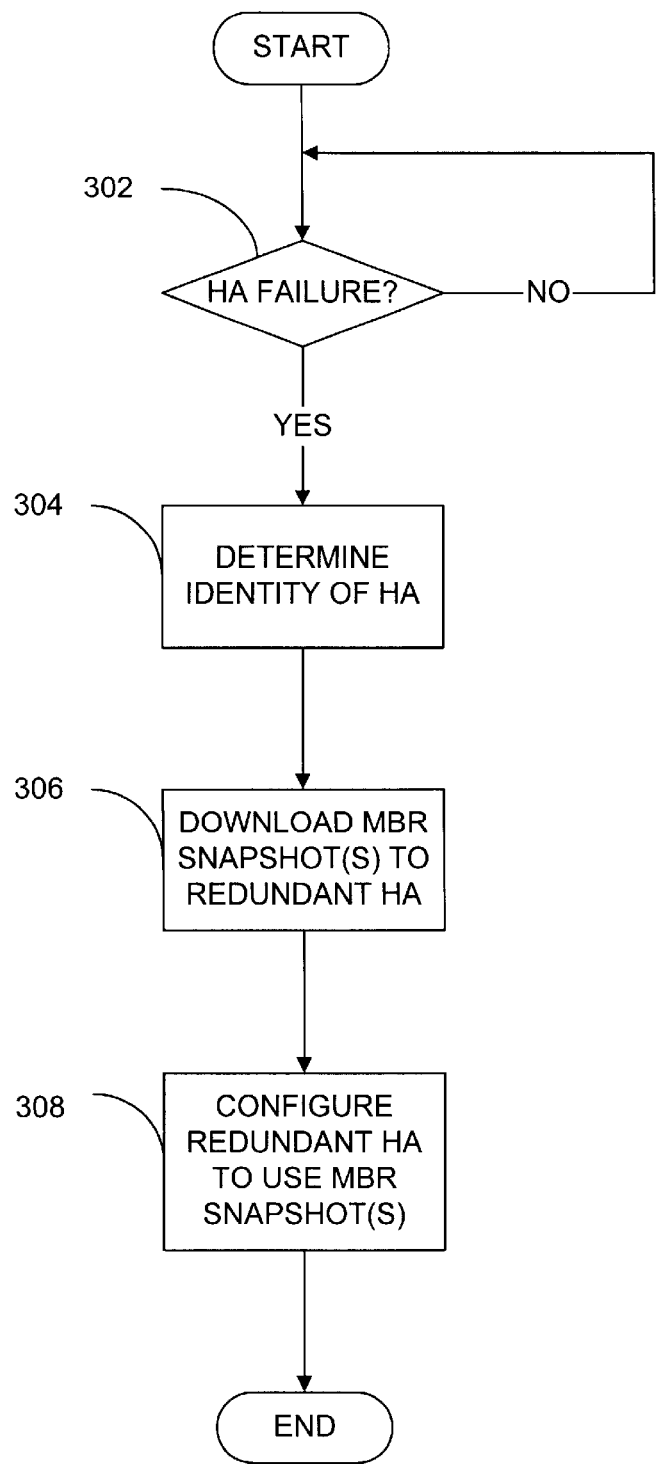
FIG. 3 is a flowchart of the operation of the HACN/HA module according to principles of the present invention.

Referring now to FIG. 3, the algorithm for detecting HA failure and providing back-up for the detected failure is described. At step 302, the active HACN determines whether there is a failure of an HA.

The detection of failed home agents can be made using any number of methods. For example, the HACN may poll every HA periodically to detect whether the HA is broadcasting a particular message, such as an address. Each HA may also report its status to the HACN on a periodic base. The system may also use an interrupt-driven approach to detect HA failures. In this case, upon failure, an HA sends an interrupt to the HACN to report the failure. Other failure-detection algorithms are possible. If the HACN detects a failure of the HA at step 302, control continues with the execution of step 304. If the HACN fails to detect a failure at step 302, control returns to step 302 where the system waits for a failure of an HA to occur.

At step 304, the HACN determines the identity of the HA that has failed. In the case where polling is used to detect failure, the HACN knows the identity of the HA that it has just polled so that it can determine the identity of the HA merely by receiving a failure message from the HA that has been most recently polled. If an interrupt-driven system is being used, then the interrupt message will contain the identity of the home agent that has failed.

Next, at step 306, the MBR snapshot for each mobile node associated with the HA is sent to the redundant HA. The MBR snapshot may include the home address of the mobile node, the foreign agent address of the mobile node, the home agent address for the mobile node, the lifetime granted to the MBR snapshot, the unexpired time left for the MBR snapshot, and the method of IP tunneling. Other types of information are possible. The MBR snapshot configures the redundant home agent. The redundant home agent is now activated and can act as the home agent for the mobile nodes having MBR snapshots associated with the home agent.

If there is more than one redundant HA, then the system will select one redundant HA to send the MBR snapshot. The selection may be made using any number of methods with any number of criteria. For example, the redundant HA may be selected from a list. The list may indicate the priority of the redundant HAs. The priority may be based upon any number of factors, for example, the capabilities of the HAs.

Of course, other factors or no factors at all may be used in any priority determination.

Then, at step 308, the MBR snapshot is used to configure the redundant HA. The redundant HA now becomes the active HA and can perform all the functions of a HA.

Figure 4:
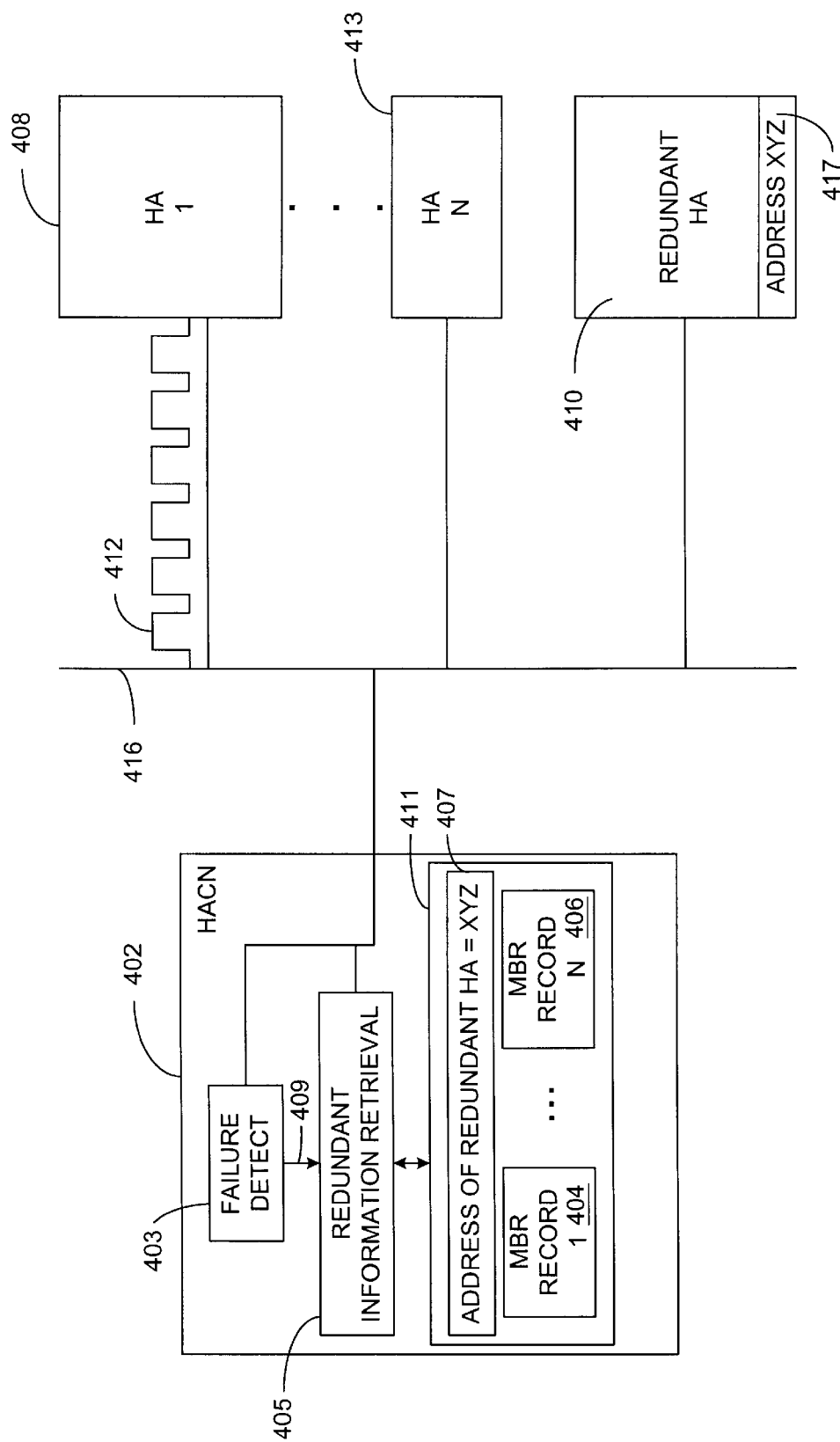
FIG. 4 is a block diagram illustrating the operation of the HACN together with a failed home agent and a redundant home agent according to principles of the present invention.

Referring now to FIG. 4, the detection of failed home agents is now described. A HACN 402, first HA 408 through nth HA 413, and redundant HA 410 are coupled to a common bus 406. The HA 408 transmits a "heartbeat" signal 412 that is detected by the HACN 402. The heartbeat signal may be a regular series of pulse, or a unique address identifying the HACN. Other types of heartbeat signals are possible. The HACN 402 periodically checks for the presence of the signal 412. Although not shown in FIG. 4, it will be understood that all the HAs 408 through 413 will transmit a heartbeat signal, all of which are monitored by the HACN 402.

In one embodiment, the HACN 402 includes a failure detect module 403, a redundant information retrieval module 403 and a memory 407. The memory 407 includes a first MBR snapshot 404 up to an nth MBR snapshot 406. In this case, the MBR snapshot 404 corresponds to HA 408. The MBR snapshots 404 through 406 contain information such as the home address of the mobile node, the foreign agent address of the mobile node, the home agent address for the mobile node, the lifetime granted to the MBR snapshot, the unexpired time left for the MBR snapshot, and the method of IP tunneling. The memory 407 also contains the address 411 of a redundant home agent, in this case, the address corresponds to redundant HA 410. The memory 407 may be any type of memory including both permanent and nonpermanent memory. It will be understood that other types of modules may be included in the HACN.

The redundant HA 410 is configured as a router with a mobile home agent functionality. The redundant HA 410 includes an address 417. In one embodiment of the present invention, the HAs 408 through 413 heartbeat their address over the bus 416.is configured with a HACN address.

The non-receipt of the heartbeat of any of the HAs 408 through 413 at the HACN 402 indicates that the HA has failed. The HACN will then proceed to activate another standby HA. In one example, the failure detect module 403 detects whether the heartbeat signal 412 is present. If the heartbeat signal is not present, the failure is indicated to the redundant information retrieval module 405 via a lead 409. Upon receipt of the signal over the lead 409, the redundant information retrieval module 405 retrieves the address of the redundant home agent 411 from the memory 407. The redundant information retrieval module 405 then sends the MBR snapshots associated with the failed home agent 408 to the redundant home agent, in this case, MBR snapshot 404, which is associated with redundant home agent 410. The address 407 matches the address 417. The redundant HA is configured using the MBR snapshot 404. The failure detect module 403 and redundant information retrieval module may be implemented in hardware, software, or any combination of hardware or software.

Figure 5:
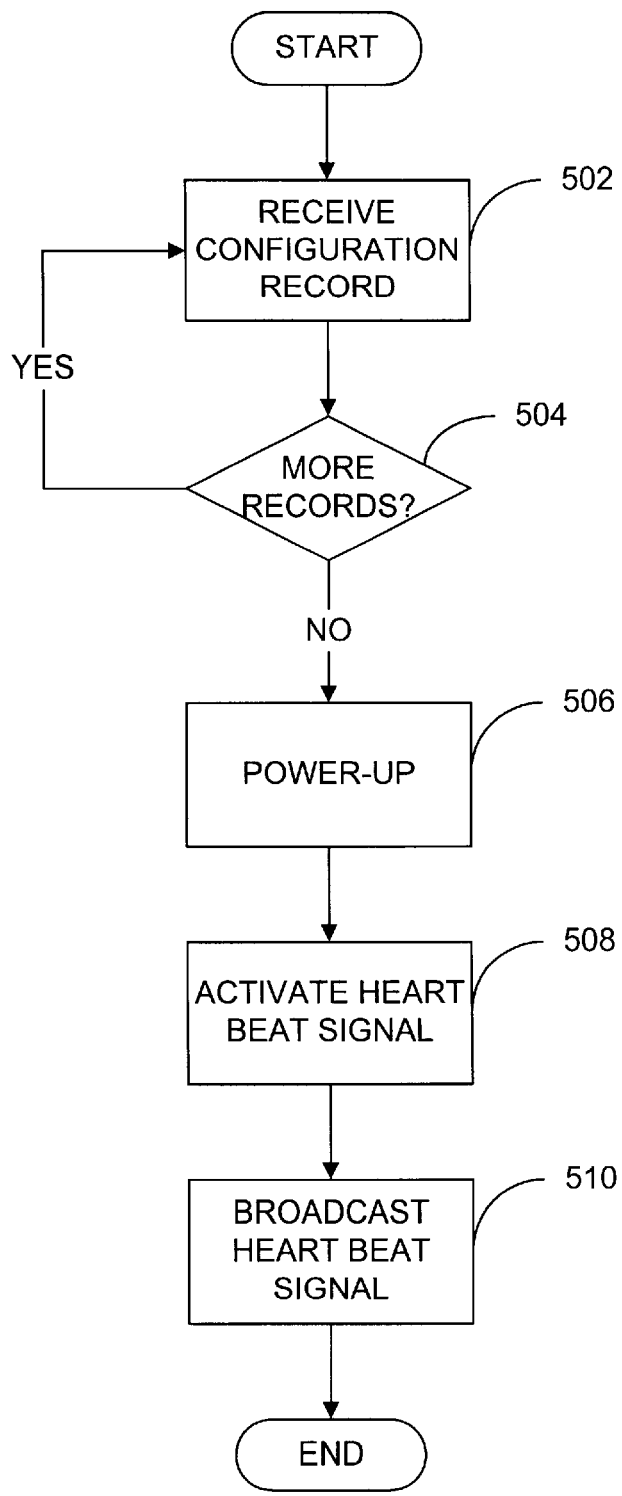
FIG. 5 is a flowchart of the operation of a redundant home agent according to principles of the present invention.

Referring now to FIG. 5, the activation process at a redundant home agent is described. At step 502, the redundant home agent receives a configuration record with configuration information for a particular mobile node. For example, this information may include the home address of the mobile node, the foreign agent address of the mobile node, the home agent address for the mobile node, the lifetime granted to the MBR snapshot, the unexpired time left for the MBR snapshot, and the method of IP tunneling.

Next, at step 504, the redundant home agent determines whether any more configuration records are to be received. If the answer is affirmative, then execution continues at step 502. If the answer is negative, then, execution continues at step 506 where the redundant home agent is powered up. Next, at step 508, the redundant home agent activates the heartbeat signal. The heartbeat signal is used by the home agent to indicate to the HACN that the home agent is functioning properly (i.e., that it has not failed). The heartbeat signal can be an HACN address. Then, at step 510, the heartbeat signal is broadcast. At this point, the redundant home agent has been configured and is ready to act as a home agent.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

We claim:

1. A system for providing redundant home agents comprising:
    a plurality of home agents, said home agents creating mobility binding registrations with outside Public Data Serving Nodes (PDSNs);
    a redundant home agent, said redundant home agent coupled to said plurality of home agents;
    a home agent control node, said home agent control node coupled to said plurality of home agents, said home agent control node sending registration requests to said home agents, said home agent control node containing a detector for determining a failure in any of said plurality of home agents, said home agent control node also containing a mobility binding registration, said home agent control node downloading said mobility binding registration to said redundant home agent upon the detection of a failure in one of said plurality of home agents; and
    a mobile node, said mobile node coupled to a PDSN, said PDSN coupled to said home agent control node.

2. The system of claim 1 wherein said mobile node comprises means for moving between a home agent coverage area and a foreign agent coverage area.

3. The system of claim 1 further comprising a redundant home agent control node wherein said redundant home agent control node is activated in response to a failure in said home agent control node.

4. The system of claim 1 further comprising a network management controller.

5. A method for replacing a home agent in a communications system comprising the steps of:
- supplying a plurality of home agents, said home agents creating mobility binding registrations with outside PDSNs;
- utilizing a home agent control node for detecting whether one of said plurality of home agents has failed and the identity of the one of the home agents that has failed; and
- sending a mobility binding registration from said home agent control node to said redundant home agent upon the detection of a failure in said selected one of said home agents, said mobility binding registration containing information sufficient to activate said redundant home agent; and
- receiving Mobile IP (MIP) registration information from a PSDN.

6. The method of claim 5 comprising the further step of routing IP traffic to an IP server.

7. The method of claim 5 comprising the further step of routing radius queries to an authentication, authorization, and accounting module.

8. The method of claim 5 comprising the further step of supplying a mobile node, and sending communications from said mobile node to said PDSN.

9. A computer useable medium having computer readable code embodied therein to enable the replacement of a selected one of a plurality of home agents with a redundant home agent, said home agents creating mobility binding registrations with outside PDSNs, the computer readable code comprising, in combination:
- utilizing a home agent control node for detecting whether said selected one of said plurality of home agents has failed and the identity of the one of the home agents that has failed; and
- sending a mobility binding registration from a home agent control node to said redundant home agent upon the detection of a failure in said selected one of said home agents, said mobility binding registration containing information sufficient to activate said redundant home agent; and
- receiving MIP registration information from a PSDN.

10. A computer program for detecting the failure of a home agent and configuring a redundant home agent comprising:
- first code for detecting whether said selected one of said plurality of home agents has failed and the identity of the one of the home agents that has failed, said plurality of home agents coupled to a PDSN and a home agent control node;
- second code for sending a mobility binding registration from said home agent control node to said redundant home agent upon the detection of a failure in said selected one of said home agents, said mobility binding registration containing information sufficient to activate said redundant home agent.

11. A home agent control node comprising:
- means for determining whether a home agent has failed, said home agent coupled to a PDSN;
- means for determining the identity of said failed home agent;
- means for identifying a redundant home agent; and
- means for sending said redundant home agent sufficient control information in order to configure said redundant home agent.

12. A network for providing communication services comprising:
- a mobile node;
- a PDSN coupled to said mobile node;
- a home agent control node coupled to said PDSN;
- a plurality of home agents coupled to said home agent control node;
- a redundant home agent coupled to said home agent control node;
- wherein said home agent control node comprises means for determining whether a home agent has failed;
- means for determining the identity of said failed home agent;
- means for identifying a redundant home agent; and
- means for sending said redundant home agent sufficient control information in order to configure said redundant home agent.

* * * * *